United States Patent [19]

Glass

[11] Patent Number: 5,822,729
[45] Date of Patent: Oct. 13, 1998

[54] FEATURE-BASED SPEECH RECOGNIZER HAVING PROBABILISTIC LINGUISTIC PROCESSOR PROVIDING WORD MATCHING BASED ON THE ENTIRE SPACE OF FEATURE VECTORS

[75] Inventor: James Robert Glass, Arlington, Mass.

[73] Assignee: Massachusetts Institute of Technology, Cambridge, Mass.

[21] Appl. No.: 658,690

[22] Filed: Jun. 5, 1996

[51] Int. Cl.$^6$ .................................................. G10L 5/06
[52] U.S. Cl. .......................... 704/255; 704/240; 704/243; 704/253
[58] Field of Search .................................... 704/240, 243, 704/253, 254, 255, 257

[56] References Cited

FOREIGN PATENT DOCUMENTS 0 715 298 A1   6/1996   European Pat. Off. .......... G10L 5/06

OTHER PUBLICATIONS

Mari Ostendorf, Vassilios V. Digalakis, and Owen A. Kimball, "From HMM's to Segment Models: A Unified View of Stochastic Modeling for Speech Recognition", IEEE Trans. on Speech and Audio Processing, vol. 4, No. 5, pp. 360–378, Sep. 1996.

James Glass, Jane Chang, and Michael McCandless, "A Probabilistic Framework for Feature–Based Speech Recognition", Proceedings of the Fourth International Conference on Spoken Language Processing (ICSLP 96), pp. 2277–2280, Oct. 1996.

Zue et al., "Recent progress on the SUMMIT system," Proc. Speech and Natural Language Workshop, pp. 380–384 (Jun. 1990).

Digilakis et al., "ML estimation of a stochastic linear system with the EM algorithm and its application to speech recognition," IEEE Trans. Speech and Audio Processing, 1(4):431–442 (Oct. 1993).

Anonymous, "Boundary Detection for Addword through Decoding," IBM Technical Disclosue Bulletin, vol. 36, No. 3, pp. 47–48 (Mar., 1993).

Vidal et al., "A review and New Approaches for Automatic Segmentation Of Speech Signals," vol. 1, Proceedings Of Eusipco–90 Fifth European Signal Processing Conference, pp. 43–53, (Sep., 1990).

Lamel et al., "High Performance speaker–independent phone recognition using CDHMM," Proc. ICASSP, pp. 447–450, (May 1996).

Mari et al., "A second–order HMM for high performance word and phoneme–based continuous speech recognition," Proc. ICASSP, pp. 435–438 (May 1996).

Robinson, "An application of recurrent nets to phone probability estimates," IEEE Trans. Neural Networks, 5(2):298–305 (Mar. 1994).

Marcus, "Phonetic recognition in a segment–based HMM," Proc. ICASSP, pp. 479–482 (Apr. 1993).

Digilakis et al,. "ML estimation of a stochastic linear system with the EM algorithm and its application to speech recognition," IEEE Trans. Speech and Audio Processing, 1(4):431–442 (Oct. 1993).

(List continued on next page.)

*Primary Examiner*—David R. Hudspeth
*Assistant Examiner*—Tālivaldis Ivars Šmits
*Attorney, Agent, or Firm*—Albert Peter Durigon

[57] ABSTRACT

A feature-based speech recognizer having a probabilistic linguistic processor provides word matching based on the entire space of feature vectors. In this manner, the errors and inaccuracies associated with the heretofore known feature-based speech recognizers, which provided word matching on less than the entire space of feature vectors, are overcome, thereby resulting in improved-accuracy speech recognition. The word matching may be on feature vectors computed either from segments or from landmarks or from both segments and landmarks. For word matching on segment-based feature vectors, acoustic likelihoods may be normalized by extra-acoustic likelihoods defined by at least one extra-acoustic ("not" or "anti") model. Context-dependent and context-independent acoustic models may be employed.

25 Claims, 4 Drawing Sheets

OTHER PUBLICATIONS

Holmes et al., "Modeling speech variability with segmental HMMs," Proc. ICASSP, pp. 447–450 (May 1996).

Ljolje et al., "High accuracy phone recognition using context clustering and quasi–triphone models," Computer Speech and Language, 8(2):129–151 (Apr. 1994).

Roucos et al., "Stochastic segment modeling using the Estimate–Maximize algorithm," Proc. ICASSP, pp. 127–130 (1988).

Goldenthal, "Statistical trajectory models for phonetic recognition," Technical report MIT/LCS/TR–642, MIT Lab. for Computer Science (Aug. 1994).

Leung et al., "Speech recognition using stochastic segment neural networks," Proc. ICASSP, pp. 613–616 (Mar. 1992).

Ostendorf and Roucos, "A stochastic segment model for phenome–based continuous speech recognition," IEEE Trans. ASSP, 37(12):1857–1869 (Dec. 1989).

Rohlicek et al., "Continuous hidden Markov modelling for speaker–independent word spotting," Proc. ICASSP, pp. 627–630 (May 1989).

Rose et al., "A hidden Markov model based keyword recognition system," Proc. ICASSP, pp. 129–132 (Apr. 1990).

Wilpon et al., "Automatic recognition of keywords in unconstrained speech using hidden Markov models," IEEE Trans. ASSP, 38(11):1870–1878 (Nov. 1990).

Cohen, "Segmenting speech using dynamic programming," Journal of the Acoustic Society of America, 69(5):1430–1438 (May 1981).

FEATURE-BASED SPEECH RECOGNIZER HAVING PROBABILISTIC LINGUISTIC PROCESSOR PROVIDING WORD MATCHING BASED ON THE ENTIRE SPACE OF FEATURE VECTORS

STATEMENT OF GOVERNMENT SUPPORT

This invention was made with government support under Grant Number N66001-94-C-6040 awarded by Department of the Navy. The government has certain rights in the invention.

FIELD OF THE INVENTION

This invention is drawn to the field of speech recognition, and more particularly, to a novel feature-based speech recognizer having a probabilistic linguistic processor providing word matching based on the entire space of feature vectors.

BACKGROUND OF THE INVENTION

In most probabilistic speech recognition systems, a linguistic processor is provided to find the sequence of words $W^*=w_1, \ldots w_N$ which maximizes the posterior probability $P(W|A)$, where W is a possible word string of a vocabulary of words and where A is the set of acoustic observations associated with the speech utterance. The acoustic observations A in the majority of speech recognition systems correspond to a temporal sequence of frames O of spectral (or other) coefficients, typically computed by an acoustic processor at regular intervals, that are representative of the incoming speech.

The linguistic processors of the heretofore known speech recognition systems segment, typically implicitly, the acoustic observations A into plural segmentations S, and find the sequence of words $W^*=w_1 \ldots w_N$ which maximizes the posterior probability $P(WS|A)$ over all possible segmentations. This may be written:

$$W^* = \arg\max_{w} \sum_{S} P(WS|A)$$

To simplify search, the heretofore known linguistic processors typically assume that there is a single correct segmentation $S^*$ associated with $W^*$, which is much more likely than any alternatives. This may be written:

$$W^* \approx \arg\max_{ws} P(WS|A)$$

As will be appreciated by those skilled in the art, by making this assumption, use is allowed of efficient search techniques, such as Viterbi or A* algorithms, among others.

Using Bayes rule, the expression for $P(WS|A)$ is usually reduced to the form:

$$P(WS|A) = \frac{P(A|SW)P(S|W)P(W)}{P(A)}$$

Since the denominator is independent of S or W, it typically is ignored during search. The $P(W)$ term is usually considered the role of the language model. The $P(S|W)$ term determines the likelihood of a particular segmentation. The $P(A|SW)$ term determines the likelihood of seeing the acoustic observations given a particular segmentation.

The heretofore known probabilistic speech recognizers may generally be divided into two classes, those having frame-based linguistic processors and those having feature-based linguistic processors. For the frame-based linguistic processors, each frame of the acoustic observations is classified in terms of acoustic models defining predetermined linguistic units so as to provide a measure of how well each frame fits all of the linguistic units. The classified frames are searched (word hypothesis matching) in terms of different ways (segmentations) the frames of the acoustic observations (taken in segments that together account for the entirety of the acoustic observations) may be combined with different sequences of one or more linguistic units to find that word string having those linguistic units that best matches the acoustic evidence. All discrete and continuous HMMs including those using artificial neural networks (ANN) for classification fit under this framework. See, for example, Lamel et al., "High Performance speaker-independent phone recognition using CDHMM," Proc. ICASSP, pp 447–450, (May 1996), and Mari et al., "A second-order HMM for high performance word and phoneme-based continuous speech recognition," Proc. ICASSP, pp 435–438 (May 1996). Other ANN architectures typically also use frames (observation vectors) as their input. See, for example, Robinson, "An application of recurrent nets to phone probability estimates," IEEE Trans. Neural Networks, 5(2):298–305 (March 1994). Many segment-based techniques also use a common set of fixed observation vectors as well. Marcus, "Phonetic recognition in a segment-based HMM," Proc. ICASSP, pp 479–482 (April 1993), for example, predetermines a set of acoustic-phonetic sub-segments, represents each by an observation vector, which is then modelled with an HMM. Other segment-based techniques hypothesize segments, but compute likelihoods on a set of observation frames. See, for example, Digilakis et al., "ML estimation of a stochastic linear system with the EM algorithm and its application to speech recognition," IEEE Trans. Speech and Audio Processing, 1(4):431–442 (October 1993), Holmes et al., "Modeling speech variability with segmental HMMs," Proc. ICASSP, pp 447–450 (May 1996), Ljolje et al., "High accuracy phone recognition using context clustering and quasi-triphone models," Computer Speech and Language, 8(2):129–151 (April 1994) and Roucos et al., "Stochastic segment modelling using the Estimate-Maximize algorithm," Proc. ICASSP, pp 127–130 (1988).

One important property of the heretofore known frame-based linguistic processors is that every segmentation S accounts for all of the frames of the acoustic observations. Thus, from a probabilistic point of view, competing word hypotheses may properly be compared to each other, since their acoustic likelihoods, $P(A|SW)$, are respectively derived from acoustic observation spaces of commensurate dimensionality.

Unlike the heretofore known frame-based linguistic processors, where word matching is performed immediately over the frames of the acoustic observations taken in plural segmentations, word matching for the heretofore known feature-based linguistic processors is performed mediately over the frames of the acoustic observations via feature vectors. A feature vector having predetermined dimensions defined by an acoustic model is extracted for each segment of a segmentation. Each feature vector is classified in terms of acoustic models defining predetermined linguistic units so as to provide a measure of how well each feature vector fits all of the linguistic units. The classified feature vectors, themselves taken over the different segments of competing segmentations of the frames of the acoustic observations, are searched in terms of the different ways the segmentations of the feature vectors may be combined with different sequences of one or more linguistic units to find that word string that best matches the acoustic evidence. See, for example, Goldenthal, "Statistical trajectory models for phonetic recognition," Technical report MIT/LCS/TR-642, MIT Lab. for Computer Science (August 1994) and the corresponding United States utility patent application of Goldenthal and Glass, entitled Segment-Based Apparatus and Method For Speech Recognition By Analyzing Multiple Speech Unit Frames and Modeling Both Temporal and Spatial Correlation Ser. No. 08/293,584, now U.S. Pat. No. 5,625,749, incorporated herein by reference, Leung et al., "Speech recognition using stochastic segment neural networks," Proc. ICASSP, pp 613–616 (March 1992), Ostendorf and Roucos, "A stochastic segment model for phoneme-based continuous speech recognition," IEEE Trans. ASSP, 37(12):1857–1869 (December 1989) and Zue et al., "Recent progress on the SUMMIT system," Proc. Speech and Natural Language Workshop, pp 380–384 (June 1990).

For the heretofore known feature-based linguistic processors, alternative segmentations of feature vectors consist of different sets of feature vectors. In addition to feature vectors X associated with a segmentation S, there are the feature vectors Y associated with the segments of the competing segmentations, which are different segmentation-to-segmentation. The acoustic likelihoods, $P(A|SW)$, computed for different word hypotheses and different segmentations of feature vectors, in each case are taken over different subsets of feature vectors. Insofar as the different subsets of feature vectors consist of observation spaces of incommensurate dimensionality, the heretofore known feature-based linguistic processors have been subjected, from a probabilistic point of view, to acoustic likelihood computational error, and therewith, to an attendant speech recognition inaccuracy.

SUMMARY OF THE INVENTION

Accordingly, it is the principal object of the present invention to provide a feature-based speech recognizer having a probabilistic linguistic processor providing word matching based on the entire space of feature vectors. The word matching may be on feature vectors computed either from segments or from landmarks or from both segments and landmarks. In this manner, the errors and inaccuracies associated with the heretofore known feature-based speech recognizers are overcome, thereby resulting in improved-accuracy speech recognition.

In accord therewith, the feature-based speech recognizer having a probabilistic linguistic processor providing word matching based on the entire space of feature vectors of the present invention includes a speech-to-observations acoustic processor and an observations-to-word string linguistic processor. The acoustic processor is responsive to human speech to provide acoustic evidence, consisting of a sequence of frames of speech-coded data that occur at a frame rate, that is representative of human speech. Any suitable acoustic processor known to those of skill in the art may be employed to provide the frames of the speech-coded data of the acoustic evidence.

The linguistic processor of the invention includes a segmenter, a feature extractor, a feature classifier operable over the entire space of feature vectors, and a probabilistic word matcher. The segmenter is responsive to the acoustic evidence (1) to parse said acoustic evidence into plural segments in such a way that each segment represents another way that said acoustic evidence may be partitioned framewise into segments, where all segments together define a segment space that accounts for all of the ways said frames of said acoustic evidence may be partitioned framewise, and (2) to combine said segments into plural segmentations S in such a way that each segmentation represents another way that said segments of said segment space may be combined segmentwise to account for all of said acoustic evidence.

In one embodiment for segment-based feature vectors, the feature extractor of the invention, coupled to the segmenter and responsive to the frames of the acoustic evidence, is operative to extract, for each segment of a possible segmentation, a feature vector having predetermined dimensions, defined by linguistic units of an acoustic model, that is representative of the presence of those linguistic units in the frames of the acoustic evidence underlying each such segment. The features may consist of averages, derivatives, or any other attribute that can be extracted from the speech signal.

The classifier operable over the entire space of feature vectors of the invention, coupled to the feature extractor and to the segmenter, is responsive to the extracted segment-based feature vectors, and to the segmentations S, to classify the feature vectors X of every segmentation in terms of the different sequences of one or more predetermined linguistic units (defined by said acoustic model) to provide a measure, $P(XY|SW)$, of how well each feature vector X of every segmentation fits all the sequences of one or more predetermined linguistic units, and in such a way as to take into account, for every segmentation, the feature vectors Y of all of the other segments of the segment space belonging to other segmentations. In the presently preferred embodiment, the acoustic model includes in addition to the class, $\{\alpha\}$, of the linguistic units, at least one extra-linguistic class, $\bar{\alpha}$, defined to map to all segments of the acoustic evidence which do not correspond to one of the linguistic units of the class $\{\alpha\}$. For example, where acoustic-modelling is done at the phonetic level, probabilistic models are provided for individual phones of the class of linguistic units, $\{\alpha\}$, as well as for non-phones, all types of sounds which are not a phonetic unit (eg, too large, too small, overlapping, and the rest) of the extra-linguistic class, $\bar{\alpha}$. Any suitable pattern recognition techniques known to those of skill in the art for acoustic modeling of phones or other linguistic units (words, syllables, and the rest), and of non-phones, such as multivariate Gaussians, mixtures of Gaussians, and, among others, artificial neural nets, may be employed.

The presently preferred embodiment of the classifier operable over the entire space of feature vectors of the linguistic processor of the instant invention (1) computes from the feature vectors of the segments of some segmentation the acoustic likelihood of a linguistic unit of the linguistic class $\alpha$ for some sequence of one or more linguistic units of different possible sequences of linguistic units, (2) computes from the feature vectors of the same segments of some segmentation the likelihood of a non-linguistic unit over the class of extra-linguistic units, $\bar{\alpha}$, (3) normalizes for each segment of some segmentation the acoustic likelihood by the likelihood of a non-linguistic unit, and (4) repeats the steps (1) and (2) until the sequences of one or more linguistic units and competing segmentations have been gone through. In this manner, only the feature vectors of the segments of the segment stream of each segmentation need be accounted for, which provides for an advantage in computational efficiency.

In another embodiment for landmark-based feature vectors, the feature extractor of the invention, coupled to the segmenter and responsive to the frames of the acoustic evidence, is operative to extract, for each hypothesized landmark of a set of landmarks, a feature vector having predetermined dimensions, defined by linguistic units of an acoustic model, that is representative of the presence of those linguistic units in the frames of the acoustic evidence underlying each such landmark. The features may consist of averages, derivatives, or any other attribute that can be extracted from the speech signal.

The classifier operable over the entire space of feature vectors of the invention, coupled to the feature extractor and to the segmenter, is responsive to the extracted feature vectors, and to the segmentations S, to classify the feature vectors Z of every hypothesized landmark in terms of the different sequences of one or more predetermined linguistic units (defined by said acoustic model) to provide a measure, $P(Z|SW)$, of how well each feature vector Z of every hypothesized landmark fits all the sequences of one or more predetermined linguistic units. Since any segmentation accounts for all of the landmark observations, Z, the acoustic likelihoods may be directly compared.

The probabilistic word matcher of the invention, coupled to the classifier operable over the entire space of feature vectors, is operative to search the feature vectors classified over the entire space of feature vectors, in terms of the ways the different sequences of one or more linguistic units fit the competing segmentations to find that word string that best matches the acoustic evidence. Any suitable technique known to those of skill in the art to provide word matching, such as Viterbi or A*, may be employed.

BRIEF DESCRIPTION OF THE DRAWINGS

These and other advantageous aspects, objects and inventive features of the present invention will become apparent as the invention becomes better understood by referring to the following solely exemplary and non-limiting detailed description of the presently preferred embodiments thereof, and to the drawings, wherein.

DETAILED DESCRIPTION OF THE PREFERRED EMBODIMENTS

Figure 1:
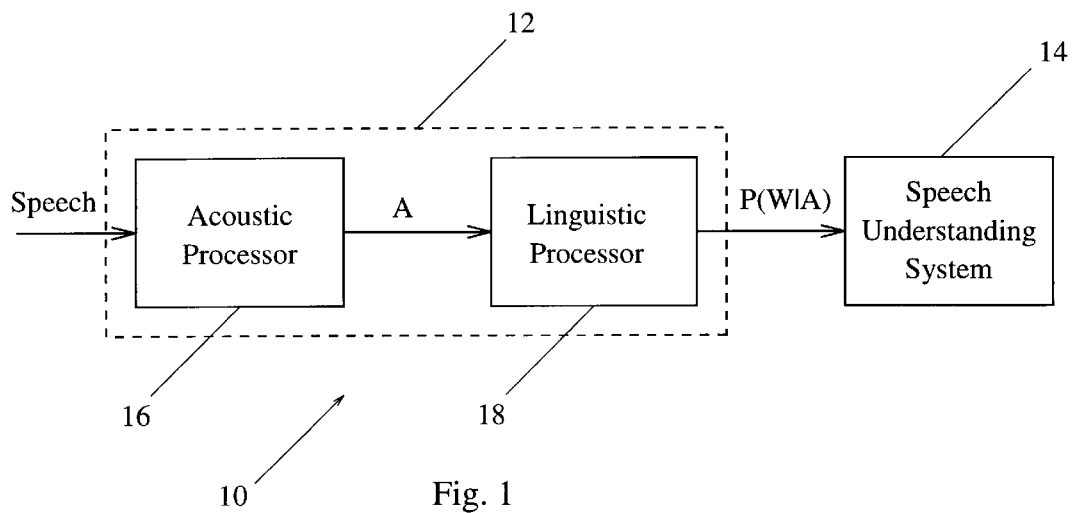
FIG. 1 is a block diagram of a probabilistic speech recognition system in accord with the present invention illustrating a typical use environment therefor.

Referring now to FIG. 1, generally designated at 10 is a block diagram of a probabilistic speech recognition system in accord with the present invention, illustrating a typical use environment therefor. A probabilistic speech recognition system schematically represented by dashed box 12 is connected to a speech understanding system 14. As appears more fully below, the probabilistic speech recognition system 12 responds to incoming speech and outputs one or more word strings from its vocabulary of words that has the maximum probability of having being spoken. The probabilistic speech understanding system 14 assigns a meaning to the word string output by the speech recognition system 12, and applies, in response thereto, an appropriate control or other action. The speech understanding system 14, that may take various embodiments in dependence on different application environments, forms no part of the instant invention and is not described further herein.

The speech recognition system 12 includes an acoustic processor 16, responsive to the incoming speech, to output digitally coded acoustic evidence A, and a probabilistic linguistic processor 18, responsive to the acoustic evidence A, to provide the word string W that maximizes the probability of having been spoken given the acoustic evidence, $P(W|A)$.

Figure 2:
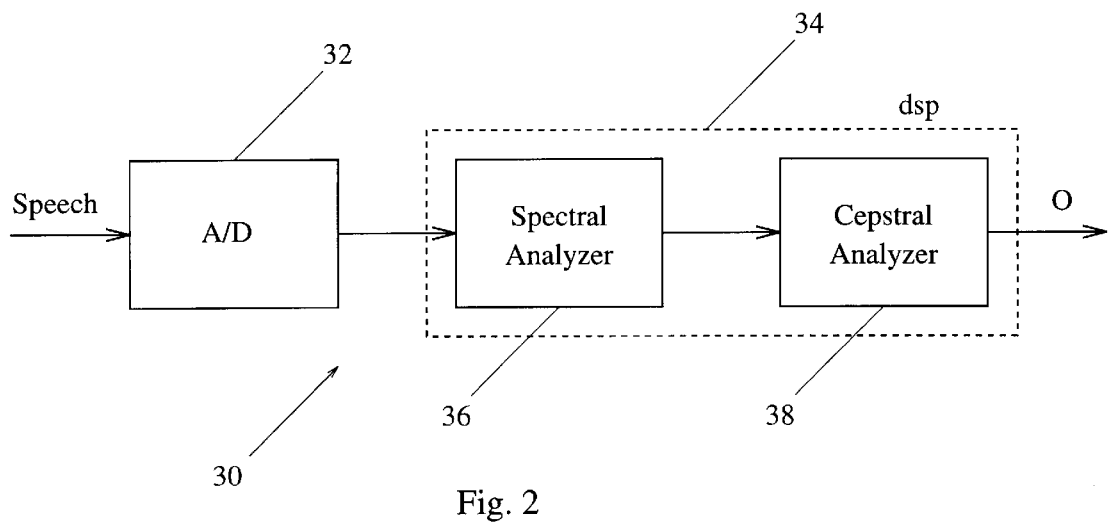
FIG. 2 is a block diagram of an acoustic processor of a probabilistic speech recognition system in accord with the present invention.

Referring now to FIG. 2, generally designated at 30 is a block diagram of a presently preferred embodiment of an acoustic processor of a probabilistic speech recognition system in accord with the present invention. The acoustic processor 30 includes an analog-to-digital (A/D) converter 32. The A/D converter 32 samples, at the Nyquist rate, the incoming analog speech signal, and digitally encodes the same, providing sampled and digitally encoded data that is representative of the incoming analog speech signal in a manner well known to those skilled in the art.

A digital signal processor schematically illustrated by dashed box 34 marked "dsp" is responsive to the sampled and digitally encoded data to provide acoustic evidence O, consisting of a sequence of frames of coded speech data that occurs at a frame rate, that is representative of predetermined linguistic units present in the sampled and digitally encoded data. In the presently preferred embodiment, the digital signal processor 34 includes a spectral analyzer 36, such as a Fast Fourier Transform (FFT) or Mel Frequency Spectral Coefficients (MFSC) spectral analyzer, and a cepstral analyzer 38, such as a Mel Frequency Cepstral Coefficients (MFCC) cepstral analyzer, although any suitable acoustic processor known to those of skill in the art may be employed to provide the acoustic evidence O. By way of example, the analog-to-digital converter 32 may provide digital samples at sixteen (16) KHz per second, the spectral analyzer 36 may provide Mel-frequency spectral coefficients (MFSC) coefficients at one hundred (100) frames per second and the cepstral analyzer 38 may provide Mel-frequency cepstral coefficients (MFCC), also at one hundred (100) frames per second.

Returning now briefly to FIG. 1, the linguistic processor 18 of the speech recognition system 12 may be typed as frame-based, or as feature-based, according to how utterances are decoded from the speech-coded acoustic evidence O. As appears more fully hereinbelow, the linguistic processor 18 in accord with the present invention belongs to the latter type, but which, unlike the heretofore known probabilistic linguistic processors for feature-based speech recognition, provides word matching based on the entire space of feature vectors.

Figure 3:
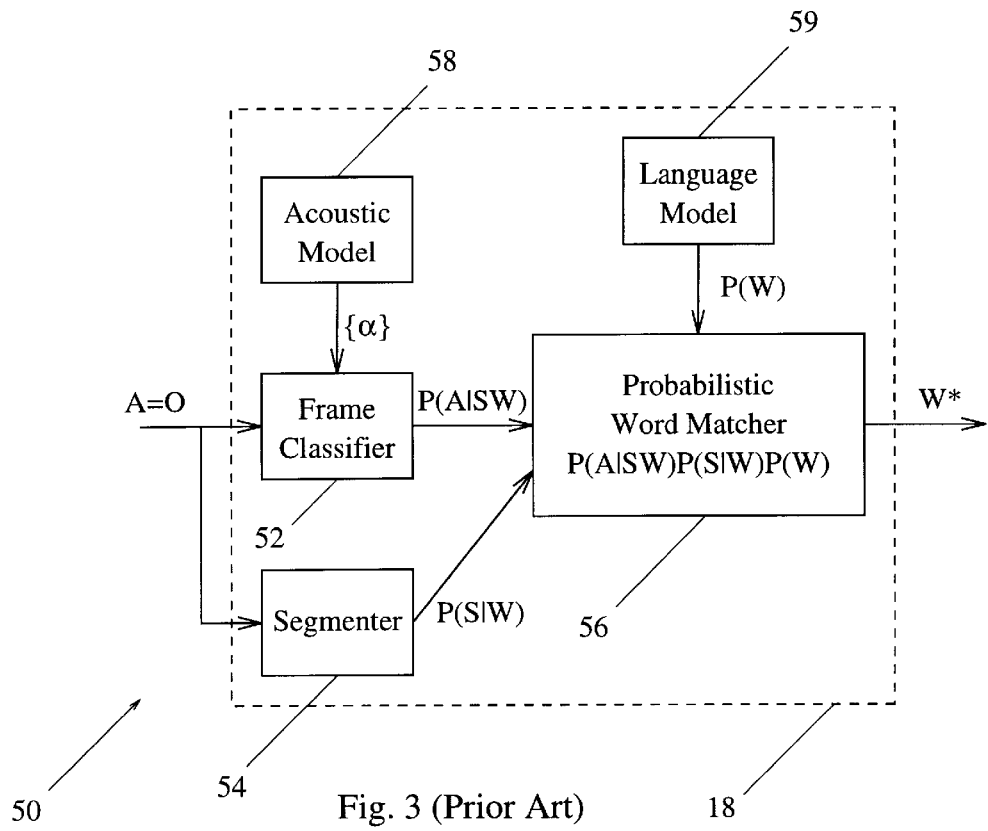
FIG. 3 is a block diagram of a prior art frame-based probabilistic linguistic processor.

Referring now to FIG. 3, generally designated at 50 is a block diagram of a prior art frame-based probabilistic linguistic processor. The frame-based probabilistic linguistic processor 50 includes three (3) main components, a frame classifier 52, a segmenter 54, and a probabilistic word matcher 56.

The frame classifier 52 is responsive to each frame of the acoustic evidence A to provide a probabilistic measure of how well each frame fits all of the linguistic units $\{\alpha\}$ (or states) provided by an acoustic model 58, $P(A|\alpha)$. In a frame-based processor, the observation space consists of a sequence of frames; therefore, A=O. The segmenter 54 is operative to parse the acoustic evidence O into plural segmentations S in such a way that the plural segmentations each represent another way that the acoustic evidence A may be segmented framewise. The probabilistic word matcher 56 is responsive to the acoustic likelihoods, $P(A|\alpha)$, representative of how well each frame fits all of the linguistic units $\{\alpha\}$ provided by the acoustic model 58, and to the plural segmentations S, to compute for every possible sequence of one or more linguistic units in its vocabulary (1) the acoustic likelihood that the acoustic evidence is given by each segmentation for every sequence of one or more linguistic units, $P(A|SW)$, (2) the probability of that segmentation given a possible sequence of one or more linguistic units, $P(S|W)$, and (3) the probability of that sequence of one or more linguistic units, $P(W)$, and outputs that string of linguistic units W* which maximizes the probability of having been spoken. As will be appreciated by those skilled in the art, the term in the denominator, $P(A)$, not shown is a constant, typically ignored during search, the $P(S|W)$ term corresponds in an Hidden Markov Model (HMM) to the state sequence likelihood, and the $P(W)$ term is usually considered the role of the language model 59. The $P(A|SW)$ term corresponds in an HMM to the observation likelihood.

One important property of the heretofore known frame-based linguistic processors is that every segmentation S accounts for all of the frames of the acoustic evidence A. Thus, from a probabilistic point of view, competing word hypotheses may properly be compared to each other, since their acoustic likelihoods, $P(A|SW)$, are respectively derived from the same acoustic observation space. Since each segmentation S accounts for all acoustic observations A, it is proper, from a probabilistic view point, to directly compare the acoustic likelihoods, $P(A|SW)$, since all likelihoods are derived from the same observation space.

Figure 4:
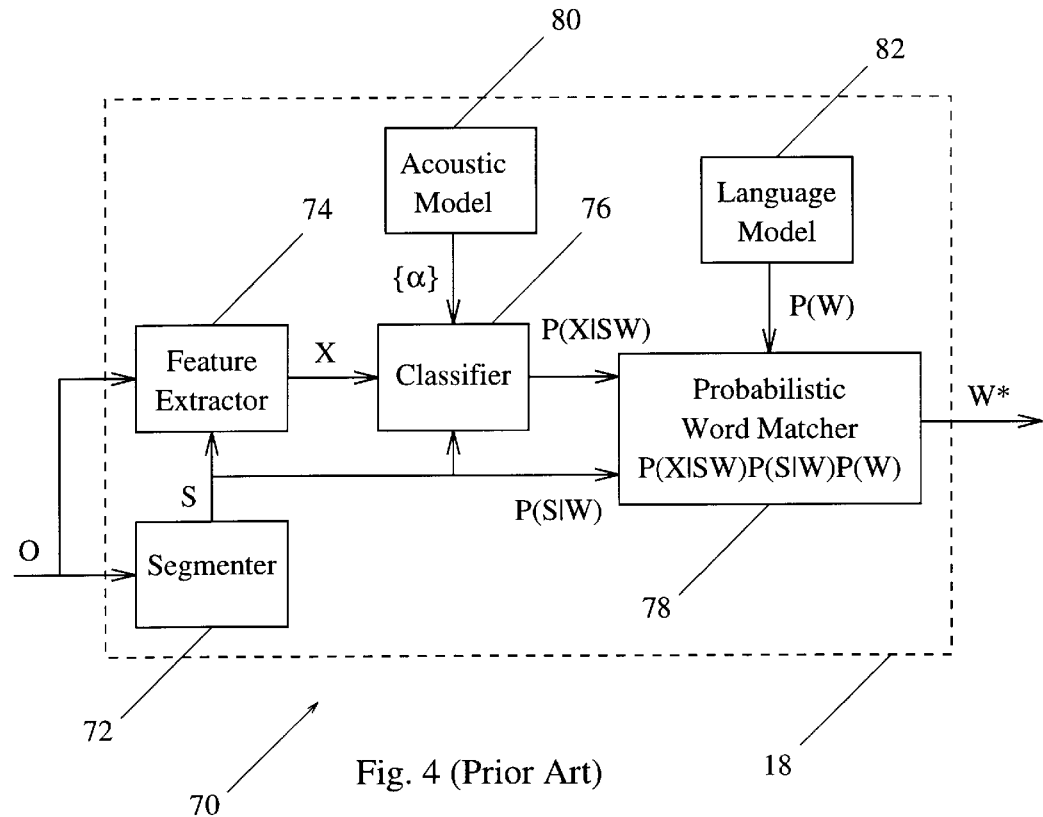
FIG. 4 is a block diagram of a prior art feature-based probabilistic linguistic processor.

Referring now to FIG. 4, generally designated at 70 is a block diagram of a prior art feature-based probabilistic linguistic processor. A principal difference between the frame-based probabilistic linguistic processor 50 described above in connection with the description of the FIG. 3, and the feature-based probabilistic linguistic processor 70 lies in the manner that the acoustic evidence O is classified during word matching. Unlike the heretofore known frame-based linguistic processors 50 (FIG. 3), where word matching is performed immediately over the frames of the acoustic observations taken in plural segmentations, word matching for the heretofore known feature-based linguistic processors is performed mediately over the frames of the acoustic observations via feature vectors. As appears more fully hereinbelow, the heretofore known feature-based probabilistic linguistic processors are disadvantageous, insofar as word matching is based on less than the entire space of feature vectors.

The feature-based linguistic processor 70 includes four (4) main components, a segmenter 72, a feature extractor 74, a feature classifier 76 operable over less than the entire set of feature vectors in a manner to be described, and a word matcher 78. The segmenter 72 is responsive to the acoustic evidence O (1) to parse the acoustic evidence O into plural segments in such a way that each segment of the segment space represents another way that the acoustic evidence may be partitioned framewise into segments, and (2) to combine the segments into plural segmentations S in such a way that each segmentation represents another way that the segments of the segment space may be combined segmentwise to account for all of the acoustic evidence O.

The feature extractor 74 is responsive to the segments of the segment space and to the acoustic evidence O to provide a feature vector of predetermined dimensions defined by an acoustic model 80 for every segment of the segment space. The acoustic model 80 is the same as that for the frame-based speech recognizer and is not separately described for the sake of brevity of explication. Unlike for the heretofore known frame-based speech recognition systems, where the probabilistic observation space is the acoustic evidence O, the probabilistic observation space for the feature-based speech recognition systems corresponds to the set of feature vectors X.

The classifier 78 is responsive to the plural segmentations S, to the extracted feature vectors and to the linguistic units defined by the acoustic model to provide a probabilistic measure, $P(X|SW)$, of how well the feature vectors X of each segmentation S fit all of the different sequences W of one or more linguistic units defined by the acoustic model 80. The probabilistic word matcher 80 is responsive to the acoustic likelihoods, $P(X|SW)$, and to the plural segmentations S, to compute, for every possible sequence of one or more linguistic units in its vocabulary, and for every segmentation S, (1) the acoustic likelihood that the classified feature vectors are given by some segmentation for some sequence of one or more lexical units, $P(X|SW)$, (2) the probability of that segmentation given a possible sequence of one or more linguistic units, $P(S|W)$, and (3) the probability of that sequence of one or more lexical units, $P(W)$, and outputs that string of linguistic units W* which maximizes the probability of having been spoken.

Figure 5:
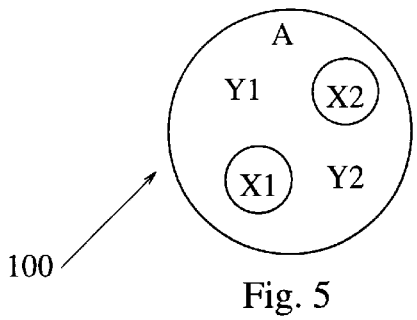
FIG. 5 is a Venn diagram useful in explaining why the feature-based probabilistic linguistic processor, of the FIG. 4 is subject, from a probabilistic point of view, to inaccuracies, insofar as word matching is based on less than the entire space of feature vectors.

Referring now to FIG. 5, generally designated at 100 is a Venn diagram useful in explaining why the feature-based probabilistic linguistic processor 70 of the FIG. 4 is subject to inaccuracies from a probabilistic point of view, insofar as word matching is based on less than the entire space of feature vectors. For the heretofore known feature-based linguistic processors, alternative segmentations of feature vectors consist of different sets of feature vectors. In addition to feature vectors X associated with a segmentation S, there are the feature vectors Y associated with the remaining segments of all possible segments, which are different segmentation-to-segmentation. A represents the entire space of feature vectors. The circle bounding $X_1$ represents the feature vectors of one segmentation $S_1$ of the space of feature vectors A and the circle bounding $X_2$ represents the feature vectors of another segmentation $S_2$ thereof. $Y_1$ represents all the feature vectors of the space of feature vectors A not in $X_1$, and $Y_2$ represents all of the feature vectors in the space of feature vectors A not in $X_2$. The acoustic likelihoods, $P(X|SW)$, computed for different word hypotheses, W, and different segmentations, S, of feature vectors, in each case, are taken, as can be seen in the FIG. 5, over different subsets of feature vectors. Insofar as the different subsets of feature vectors for the competing segmentations are drawn from observation sets of incommensurate dimensionality, the heretofore known feature-based linguistic processors have been subjected, from a probabilistic point of view, to acoustic likelihood computational error, and therewith, to an attendant speech recognition inaccuracy.

Figure 6:
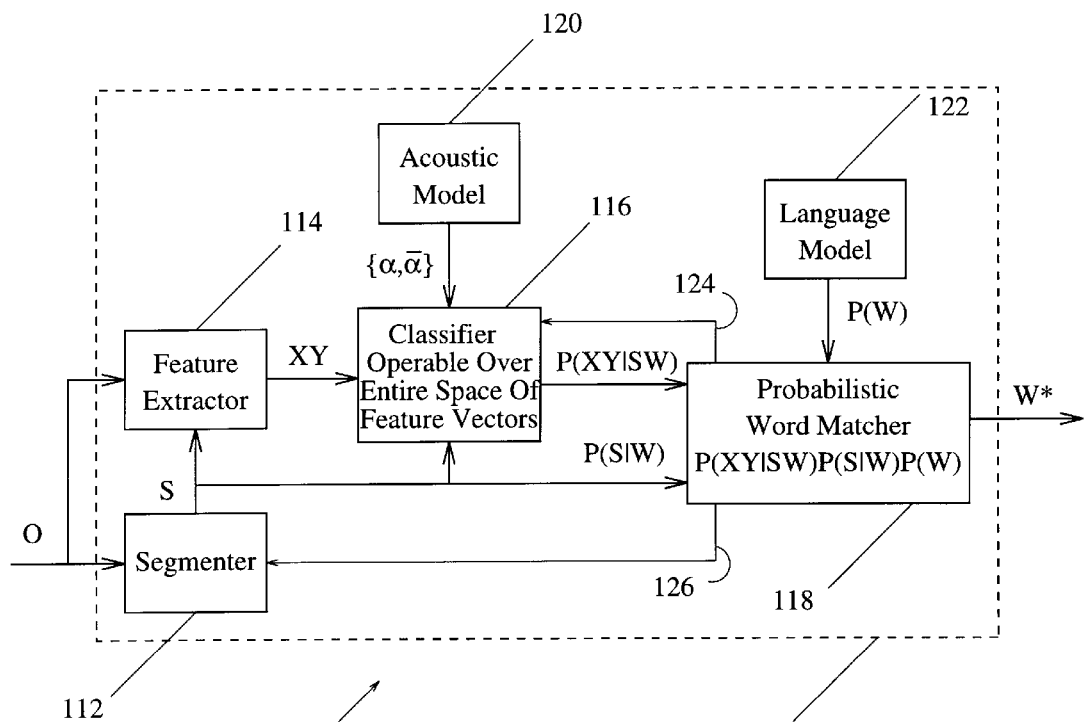
FIG. 6 is a block diagram of a feature-based probabilistic linguistic processor providing word matching based on the entire space of segment-based feature vectors in accord with the present invention.

Referring now to FIG. 6, generally designated at 110 is a block diagram of a feature-based probabilistic linguistic processor providing word matching based on the entire space of segment-based feature vectors in accord with the present invention. The feature-based probabilistic linguistic processor 110 includes four (4) main components, a segmenter 112, a feature extractor 114, a feature classifier 116 operable over the entire space of segment-based feature vectors in a manner to be described, and a word matcher 118. The segmenter 112 is responsive to the acoustic evidence O (1) to parse the acoustic evidence O into plural segments in such a way that each segment represents another way that the acoustic evidence O may be partitioned framewise into segments, where all segments together define a segment space that accounts for all of the ways said frames of said acoustic evidence O may be partitioned framewise, and (2) to combine the segments into plural segmentations S in such a way that each segmentation represents another way that said segments of the segment space may be combined segmentwise to account for all of the acoustic evidence.

The feature extractor 114, coupled to the segmenter 112 and responsive to the frames of the acoustic evidence O, is operative to extract for each segment of a possible segmentation a feature vector having predetermined dimensions defined by linguistic units $\{\alpha\}$ of an acoustic model 120 that is representative of the presence of those linguistic units in the frames of the acoustic evidence O underlying each such segment. For each segmentation S, the entire observation space of feature vectors A consists of the feature vectors X of the segments in that segmentation, and of the feature vectors Y of the segment space corresponding to the other, competing segmentations; A=X∪Y.

The classifier 116 operable over the entire space of segment-based feature vectors, coupled to the feature extractor 114 and to the segmenter 112, is responsive to the extracted feature vectors, and to the segmentations S, to classify the feature vectors X of every segmentation in terms of the different sequences W of one or more predetermined linguistic units (defined by said acoustic model) to provide a measure, P(XY|SW), of how well each feature vector X of every segmentation fits all the sequences of one or more predetermined linguistic units, and in such a way as to take into account, for every segmentation, the feature vectors Y of all of the other segments of the segment space belonging to other segmentations.

The probabilistic word matcher 118, coupled to the classifier 116 operable over the entire space of segment-based feature vectors, is responsive to the joint likelihoods, P(XY|SW), and to the plural segmentations S, to compute, for every possible sequence of one or more linguistic units in its vocabulary, and for every segmentation S, (1) the joint likelihoods, P(XY|SW), computed for each segmentation over the entire space of feature vectors and for the different sequences of one or more linguistic units, (2) the probability of every segmentation given a possible sequence of one or more lexical units, P(S|W), and (3) the probability of the sequences of one or more lexical units, P(W), and outputs that string of linguistic units W* which maximizes the probability of having been spoken.

As schematically illustrated by the arrows 124, 126, segmentation may be performed explicitly, or implicitly on demand, and the segmentation space may be exhaustive, or restricted in some way.

Figures 7A, 7B:
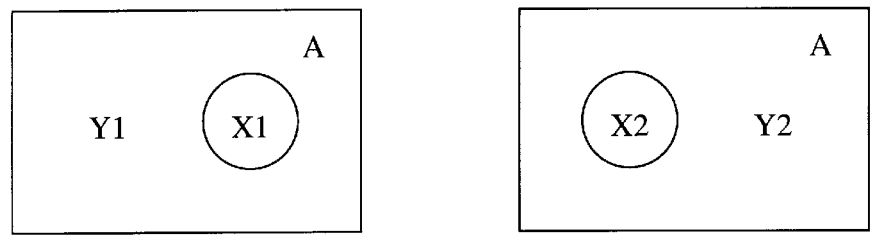
FIG. 7, in the FIGS. 7A, 7B thereof, shows Venn diagrams useful in explaining why the feature-based probabilistic linguistic processor of the FIG. 6 obtains, from a probabilistic point of view, improved accuracy, insofar as word matching is based on the entire space of feature vectors.

Referring now to FIGS. 7A, 7B, generally designated at 140 and 150 are Venn diagrams useful in explaining why the feature-based probabilistic linguistic processor 110 of the FIG. 6 obtains, from a probabilistic point of view, improved accuracy, insofar as word matching is based on the entire space of segment-based feature vectors. The diagram 140 of FIG. 7A is representative of the feature vectors of one segmentation and the Venn diagram 150 of FIG. 7B is representative of the feature vectors of another segmentation. In FIG. 7A, the circle bounding X, represents the feature vectors of one segmentation $S_1$, and $Y_1$ represents the feature vectors of the segments of the segment space belonging to all other competing segmentations. Likewise, the circle bounding $X_2$ in the FIG. 7B illustrates the feature vectors of another segmentation $S_2$, and $Y_2$ represents the feature vectors of the segments of the segment space belonging to all other competing segmentations. In the FIGS. 7A, 7B, A represents the entire space of segment-based feature vectors. Since classification of any competing segmentations $S_1$, $S_2$ is always based on observation sets of feature vectors, $X_1$, $Y_1$ and $X_2$, $Y_2$, that are of commensurate dimensionality, namely the entire, self-same space of segment-based feature vectors A (as schematically illustrated by the identical sizes of the Venn diagrams 140, 150), the joint likelihoods, P(XY|SW), for competing segmentations may, from a probabilistic point of view, be directly compared, thereby overcoming the probabilistic errors and attendant speech recognition inaccuracies of the heretofore known feature-based linguistic processors.

In accord with the presently preferred embodiment of the feature-based speech recognizer having a probabilistic linguistic processor providing word matching over the entire space of segment-based feature vectors of the present invention, a segment, $s_i$, is represented by a fixed-dimension feature vector, $x_i = a_j$. The feature vectors of a segmentation S consists of a subset, X, of the entire observation space A of segment-based feature vectors.

The entire observation space A consists of X, the feature vectors of the segments in S, as well as Y, the remaining feature vectors of the possible segments of the segment space not in S. This may be written:

$$A = X \cup Y.$$

Thus, the expression P(A|SW) for the acoustic likelihoods computed by the classifier 118 may be written:

$$P(A|SW) = P(XY|SW) = P(XY|W)$$

The latter term arises from the direct relationship between S and X.

To compare competing segmentations, the classifier 118 operable over the entire space of segment-based feature vectors predicts for every segmentation S the likelihood of both X and Y for every sequence of one or more linguistic units.

In the presently preferred embodiment, the acoustic model 120 includes, in addition to the class, $\{\alpha\}$, of linguistic units, at least one extra-linguistic class, $\bar{\alpha}$, defined to map to all segments of the acoustic evidence which do not correspond to one of the linguistic units of the linguistic class $\{\alpha\}$. For example, where acoustic-modelling is done at the phonetic level, probabilistic models are provided for individual phones of the class of linguistic units, $\{\alpha\}$, as well as for non-phones, all types of sounds which are not a phonetic unit (eg, too large, too small, overlapping, and the rest) of the extra-linguistic class, $\bar{\alpha}$.

In the presently preferred embodiment, Y is assigned to the non-lexical class $\bar{\alpha}$ (e.g., too big or too small) defined by the acoustic model 120. During classification, the segments X of S are assigned to linguistic units of the linguistic class $\alpha$, and all other segments, Y, are assigned to the non-linguistic units of the at least one extra-linguistic class $\bar{\alpha}$.

Assuming independence between segments, the expression for the acoustic likelihoods computed by the linguistic processor 118 may be written:

$$P(XY|SW) = P(X|W)P(Y|W) = \frac{P(X|W)}{P(X|\bar{\alpha})} P(X|\bar{\alpha})P(Y|\bar{\alpha})$$

It should be noted that the term $P(X|W)$ represents the acoustic likelihoods computed by the heretofore known feature-based linguistic processors. It should also be noted that having introduced the unit term $P(X|\bar{\alpha})/P(X|\bar{\alpha})$ allows for computational efficiency, as appears more fully hereinbelow, although the joint likelihoods $P(XY|SW)$ may be otherwise computed without departing from the inventive concepts.

The term $P(X|\bar{\alpha}) P(Y|\bar{\alpha})$ is a constant for all segments, which may be written:

$$P(X|\bar{\alpha})P(Y|\bar{\alpha}) = P(A|\bar{\alpha}) = \prod_i P(a_i|\bar{\alpha})$$

Since $P(A|\bar{\alpha})$ is constant, we can ignore it and only consider segments in S (i.e. X) during search:

$$W^* = arg \max_{W,S} \prod_i \frac{P(x_i|W)}{P(x_i|\bar{\alpha})} p(s_i|W)P(W)$$

Figure 8:
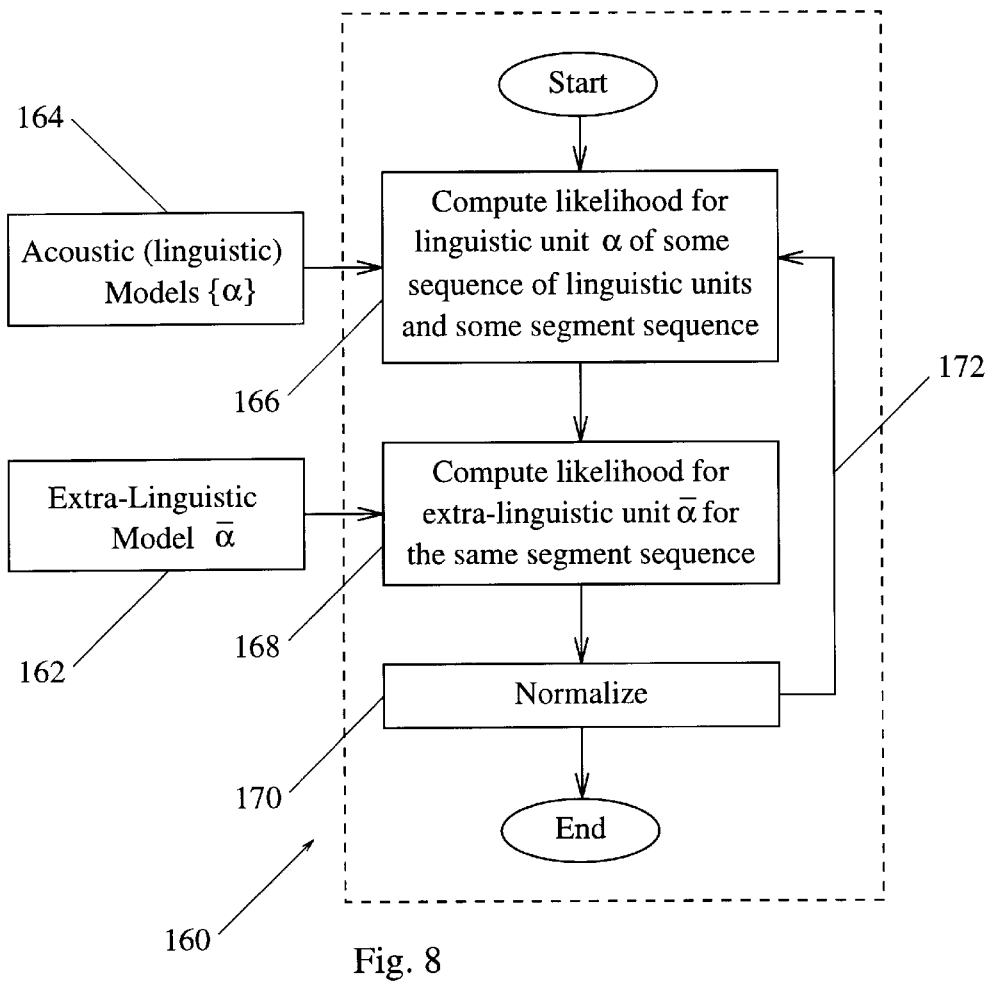
FIG. 8 is a flow chart useful in explaining the operation of a presently preferred embodiment of the feature-based speech recognizer having a probabilistic linguistic processor providing word matching based on the entire space of segment-based feature vectors in accord with the present invention.

Referring now to FIG. 8, generally designated at 160 is a flow chart illustrating the operation of a presently preferred embodiment of the classifier operable over the entire space of segment-based feature vectors of the feature-based speech recognizer having probabilistic linguistic processor providing word matching based on the entire space of feature vectors in accord with the present invention. As shown by block 162, the extra-linguistic model, $\bar{\alpha}$, is trained, and parametric representations of extra-linguistic units observed in the training data are retained.

As shown by a block 164, the acoustic models, $\{\alpha\}$, are trained, and parametric representations of linguistic units observed in the training data are retained. As will be appreciated by those of skill in the art, context-dependent and/or context-independent acoustic models may be trained.

As shown by a block 166, the acoustic likelihood for a linguistic unit of some sequence of linguistic units and for a given segment sequence is computed.

As shown by a block 168, the likelihood for an extra-linguistic unit for the same sequence is then computed.

As shown by a block 170, the acoustic likelihood for the linguistic unit is normalized by the likelihood for the extra-linguistic unit for the same segment sequence.

As shown by an arrow 172, the process is repeated for the linguistic units of all of the possible sequences of one or more linguistic units in its vocabulary and for all competing segmentations to find the word string W* that best matches the acoustic evidence.

It may be noted that the normalization criterion used for segment-based decoding can be interpreted as a likelihood ratio. Acoustic log-likelihood scores are effectively normalized by the anti-phone. Phones which score better than the anti-phone will have a positive score, while those which are worse will be negative. In cases of segments which are truly not a phone, the phone scores are typically all negative. Note that the anti-phone is not used during lexical access. Its only role is to serve as a form of normalization for the segment scoring. In this way, it has similarities with techniques being used in word-spotting, which compare acoustic likelihoods with those of "filler" models. See, for example, Rohlicek et al., "Continuous hidden Markov modelling for speaker-independent word spotting," Proc. ICASSP, pp 627–630 (May 1989), Rose et al., "A hidden Markov model based keyword recognition system," Proc. ICASSP, pp 129–132 (April 1990), and Wilpon et al., "Automatic recognition of keywords in unconstrained speech using hidden Markov models," IEEE Trans. ASSP, 38(11):1870–1878 (November 1990). The likelihood or odds ratio was also used by Cohen in an HMM application for segmenting speech, "Segmenting speech using dynamic programming," Journal of the Acoustic Society of America, 69(5):1430–1438 (May 1981).

Figure 9:
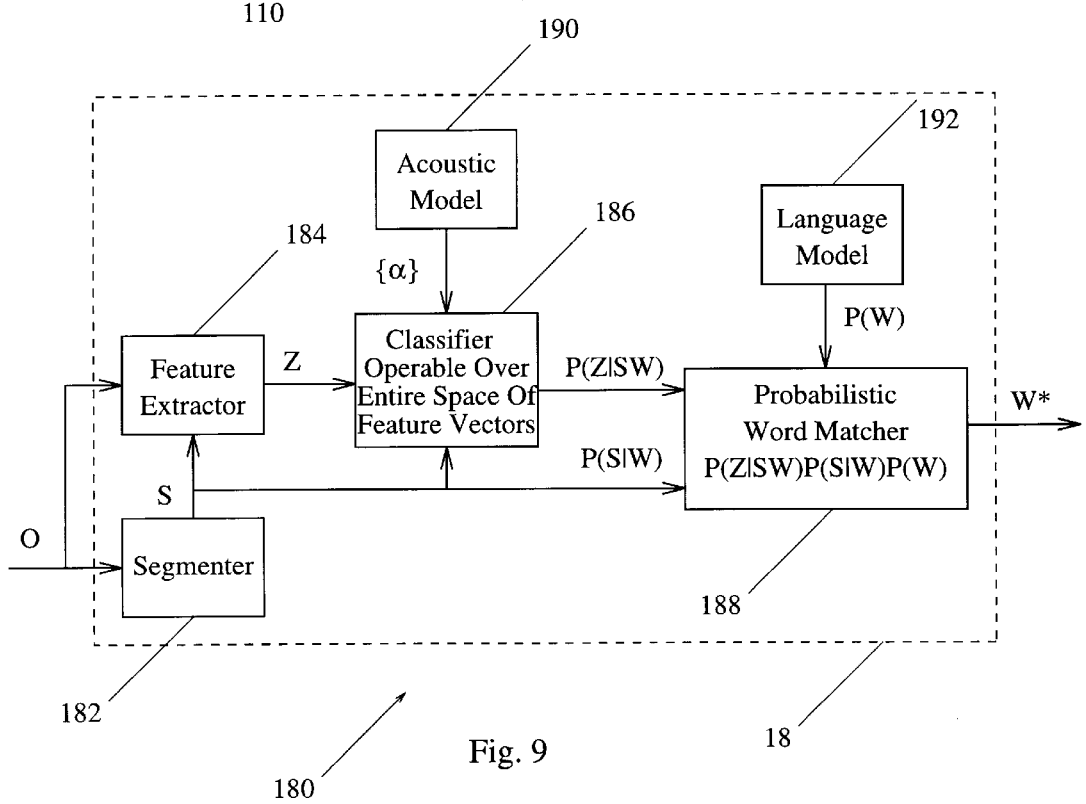
FIG. 9 is a block diagram of a feature-based probabilistic linguistic processor providing word matching based on the entire space of landmark-based feature vectors in accord with the present invention.

Referring now to FIG. 9, generally designated at 180 is a block diagram of a feature-based probabilistic linguistic processor providing word matching based on the entire space of landmark-based feature vectors in accord with the present invention. The feature-based probabilistic linguistic processor 180 includes four (4) main components, a segmenter 182, a feature extractor 184, a feature classifier 186 operable over the entire space of landmark-based feature vectors in a manner to be described, and a word matcher 188. The segmenter 182 is responsive to the acoustic evidence O (1) to parse the acoustic evidence O into plural segments in such a way that each segment represents another way that the acoustic evidence O may be partitioned framewise into segments, where all segments together define a segment space that accounts for all of the ways said frames of said acoustic evidence O may be partitioned framewise, and (2) to combine the segments into plural segmentations S in such a way that each segmentation represents another way that said segments of the segment space may be combined segmentwise to account for all of the acoustic evidence. The segmenter 182 also defines a set of landmarks which represent transitions between segments.

The feature extractor 184, coupled to the segmenter 182 and responsive to the frames of the acoustic evidence O, is operative to extract for each landmark of a possible segmentation a feature vector having predetermined dimensions defined by linguistic units $\{\alpha\}$ of an acoustic model 120 that is representative of the presence of those linguistic units in the frames of the acoustic evidence O underlying each such landmark. For each segmentation S, the entire observation space of landmark-based feature vectors A consists of the feature vectors Z of the landmarks (transitions or internal) in that segmentation.

The classifier 186 operable over the entire space of landmark-based feature vectors, coupled to the feature extractor 184 and to the segmenter 182, is responsive to the extracted feature vectors, and to the segmentations S, to classify the feature vectors Z of every landmark in terms of the different sequences W of one or more predetermined linguistic units (defined by said acoustic model) to provide a measure, $P(Z|SW)$, of how well each feature vector $z_i$ of every landmark fits all the sequences of one or more predetermined linguistic units. If Z corresponds to a set of observations taken at landmarks or boundaries, then a particular segmentation will correspond to some of these boundaries being valid, in that they correspond to a transition between two linguistic units, while others are not valid, perhaps being internal to a linguistic unit. Thus, any segmentation accounts for all of the landmark observations, Z, so that there is no need of the normalization criterion, or its equivalent, for segment-based feature vectors discussed above in connection with the description of the embodiment of the FIGS. 6–8.

If we assume independence between $N_z$ individual feature-vectors in Z, P(Z¦SW) can be written:

$$P(Z|SW) = \prod_{i=1}^{N_z} P(z_i|SW)$$

The probabilistic word matcher 188, coupled to the classifier 186 operable over the entire space of landmark-based feature vectors, is responsive to the likelihoods, P(Z¦SW), and to the plural segmentations S, to compute, for every possible sequence of one or more linguistic units in its vocabulary, and for every segmentation S, (1) the likelihoods, P(Z¦SW), computed for each segmentation over the entire space of landmark-based feature vectors and for the different sequences of one or more linguistic units, (2) the probability of every segmentation given a possible sequence of one or more lexical units, P(S¦W), and (3) the probability of the sequences of one or more lexical units, P(W), and outputs that string of linguistic units W* which maximizes the probability of having been spoken.

It may be noted that, as will be appreciated by those of skill in the art, landmarks correspond to the times which are hypothesized segment boundaries, typically points in the speech waveform where there is transition from one type of sound to another type of sound. For any particular segmentation, there are two (2) general types of landmark, "internal" and "transition" boundaries; the landmarks falling within a segmentation are the so-called "internal" ones, while those falling between the segments of that segmentation are the so-called "transition" ones.

Many modifications, such as computing the joint likelihoods P(XYZ¦SW), either assuming independence therebetween or otherwise, or decoding encoded speech data in either a frame-based or feature-based speech recognizer using both acoustic and extra-linguistic models, or using landmark-based feature vectors in a frame-based speech recognizer of the presently disclosed invention will become apparent to those of skill in the art having benefitted by the instant disclosure without departing from the inventive concepts.

What is claimed is:

1. A feature-based speech recognizer having a probabilistic linguistic processor providing word matching based on the entire space of segment-based feature vectors, comprising:

a segmenter responsive to acoustic evidence O in form of frames of speech-coded data representative of the speech to be recognized and operative (1) to parse said acoustic evidence into plural segments in such a way that each segment represents another way that said acoustic evidence may be partitioned framewise into segments, where all segments together define a segment space that accounts for all of the ways said frames of said acoustic evidence may be partitioned framewise, and (2) to combine said segments into plural segmentations S in such a way that each segmentation represents another way that said segments of said segment space may be combined segmentwise to account for all of said acoustic evidence;

a feature extractor, coupled to the segmenter and responsive to the frames of the acoustic evidence, and operative to extract, for each segment of a possible segmentation, a feature vector X having predetermined dimensions defined by linguistic units of an acoustic model that is representative of the presence of those linguistic units in the frames of the acoustic evidence underlying each such segment;

a classifier operable over the entire space of feature vectors, coupled to the feature extractor and to the segmenter, responsive to the extracted feature vectors, and to the segmentations S, and operative to classify the segment-based feature vectors X of every segmentation in terms of the different sequences of one or more predetermined linguistic units to provide a joint likelihood, P(XY¦SW), that is a measure of how well each feature vector X of every segmentation fits all the sequences of one or more predetermined linguistic units, and in such a way as to take into account, for every segmentation, the feature vectors Y of all of the other segments of the segment space belonging to other segmentations; and a probabilistic word matcher, coupled to the classifier operable over the entire space of feature vectors, and operative to search the feature vectors classified over the entire space of segment-based feature vectors in terms of the ways the different sequences of one or more linguistic units fit the competing segmentations to find that word string that best matches the acoustic evidence.

2. The invention of claim 1, wherein the acoustic model includes in addition to the class, $\alpha$, of the linguistic units, at least one extra-linguistic class, $\overline{\alpha}$, defined to map to all segments of the acoustic evidence which do not correspond to one of the linguistic units of the class $\alpha$.

3. The invention of claim 2, wherein acoustic-modelling is done at the phonetic level, and wherein probabilistic models are provided for individual phones of the class of linguistic units, $\alpha$, as well as for non-phones, of the extra-linguistic class, $\overline{\alpha}$.

4. The invention of claim 2, wherein the classifier operable over the entire space of feature vectors of the linguistic processor of the instant invention (1) classifies the feature vectors of the segments of the entire segment space in terms of the non-linguistic units of the class of extra-linguistic units, $\overline{\alpha}$, (2) computes from the feature vectors of the segments of some segmentation the acoustic likelihood of a linguistic unit of the linguistic class a for some sequence of one or more linguistic units of different possible sequences of linguistic units, (3) computes from the feature vectors of the same segments of some segmentation the likelihood of a non-linguistic unit over the class of extra-linguistic units, $\overline{\alpha}$, (4) normalizes for each segment of some segmentation the acoustic likelihood by the likelihood of a non-linguistic unit, and (4) repeats the hereinabove steps (2) and (3) until the sequences of one or more linguistic units and competing segmentations have been gone through.

5. The invention of claim 1, further including an acoustic processor to provide said acoustic evidence O in response to human speech to be recognized.

6. The invention of claim 5, wherein the acoustic processor includes an analog-to-digital (A/D) converter responsive to human speech to sample the same, at the Nyquist rate, and to digitally encode the same providing sampled and digitally encoded data that is representative of the incoming speech signal, and a digital signal processor responsive to the sampled and digitally encoded data to provide said acoustic evidence O, consisting of a sequence of frames of coded speech data that occurs at a frame rate, that is representative of predetermined linguistic units present in the sampled and digitally encoded data.

7. The invention of claim 6, wherein the digital signal processor includes a spectral analyzer.

8. The invention of claim 6, wherein the digital signal processor includes a cepstral analyzer.

9. The invention of claim 7, wherein said spectral analyzer is a Mel Frequency Spectral Coefficients (MFSC) spectral analyzer.

10. The invention of claim 8, wherein said cepstral analyzer is a Mel Frequency Cepstral Coefficients (MFCC) cepstral analyzer.

11. The invention of claim 1, wherein said word matcher coupled to the classifier operable over the entire space of feature vectors, is responsive to the joint likelihoods, P(XY¦SW), and to the plural segmentations S, to compute, for every possible sequence of one or more linguistic units in its vocabulary, and for every segmentation S, (1) the joint likelihoods, P(XY¦SW), computed for each segmentation over the entire space of feature vectors and for the different sequences of one or more linguistic units, (2) the probability of every segmentation given a possible sequence of one or more lexical units, P(S¦W), and (3) the probability of the sequences of one or more lexical units, P(W), and outputs that string of linguistic units W* which maximizes the probability of having been spoken.

12. A feature-based speech recognizer having a probabilistic linguistic processor providing word matching based on the entire space of landmark-based feature vectors, comprising:

a segmenter responsive to acoustic evidence O in form of frames of speech-coded data representative of the speech to be recognized and operative (1) to parse said acoustic evidence into plural segments in such a way that each segment represents another way that said acoustic evidence may be partitioned framewise into segments and landmarks, where all segments together define a segment space that accounts for all of the ways said frames of said acoustic evidence may be partitioned framewise, and (2) to combine said segments into plural segmentations S in such a way that each segmentation represents another way that said segments of said segment space may be combined segmentwise to account for all of said acoustic evidence;

a feature extractor, coupled to the segmenter and responsive to the frames of the acoustic evidence, and operative to extract, for each landmark of a possible segmentation, a feature vector Z having predetermined dimensions defined by linguistic units of an acoustic model that is representative of the presence of those linguistic units in the frames of the acoustic evidence underlying each such landmark;

a classifier operable over the entire space of feature vectors, coupled to the feature extractor and to the segmenter, responsive to the extracted feature vectors, and to the segmentations S, and operative to classify the landmark-based feature vectors Z of every segmentation in terms of the different sequences of one or more predetermined linguistic units to provide a likelihood, P(Z ISW), that is a measure of how well each feature vector Z of every landmark fits all the sequences of one or more predetermined linguistic units; and a probabilistic word matcher, coupled to the classifier operable over the entire space of feature vectors, and operative to search the feature vectors classified over the entire space of landmark-based feature vectors in terms of the ways the different sequences of one or more linguistic units fit the competing segmentations to find that word string that best matches the acoustic evidence.

13. The invention of claim 12, further including an acoustic processor to provide said acoustic evidence A in response to human speech to be recognized.

14. The invention of claim 13, wherein the acoustic processor includes an analog-to-digital (A/D) converter responsive to human speech to sample the same, at the Nyquist rate, and to digitally encode the same providing sampled and digitally encoded data that is representative of the incoming speech signal, and a digital signal processor responsive to the sampled and digitally encoded data to provide said acoustic evidence O, consisting of a sequence of frames of coded speech data that occurs at a frame rate, that is representative of predetermined linguistic units present in the sampled and digitally encoded data.

15. The invention of claim 13, wherein the digital signal processor includes a spectral analyzer.

16. The invention of claim 13, wherein the digital signal processor includes a cepstral analyzer.

17. The invention of claim 15, wherein said spectral analyzer is a Mel Frequency Spectral Coefficients (MFSC) spectral analyzer.

18. The invention of claim 16, wherein said cepstral analyzer is a Mel Frequency Cepstral Coefficients (MFCC) cepstral analyzer.

19. The invention of claim 1, wherein said word matcher coupled to the classifier operable over the entire space of feature vectors, is responsive to the likelihoods, P(Z¦SW), and to the plural segmentations S, to compute, for every possible sequence of one or more linguistic units in its vocabulary, and for every segmentation S, (1) the likelihoods, P(Z¦SW), computed for each segmentation over the entire space of feature vectors and for the different sequences of one or more linguistic units, (2) the probability of every segmentation given a possible sequence of one or more lexical units, P(S¦W), and (3) the probability of the sequences of one or more lexical units, P(W), and outputs that string of linguistic units W* which maximizes the probability of having been spoken.

20. A method for decoding speech from encoded speech data, comprising the steps of:

segmenting said encoded speech data into plural segments of a segment space and into plural segmentations each having at least one constitutive segments;

extracting for acoustic analysis from said data a network of feature vectors defined over said plural segmentations;

providing at least one model to be used during word matching; and performing word matching for competing word hypotheses in each case over the entire network of feature vectors.

21. The method of claim 20, wherein said extracting step includes the step of extracting a network of segment-based feature vectors.

22. The method of claim 20, wherein said segmenting step further includes the step of defining landmarks associated with said plural segments and wherein said extracting step includes the step of extracting a network of landmark-based feature vectors.

23. The method of claim 20, wherein said segmenting step further includes the step of defining landmarks associated with said plural segments and wherein said extracting step includes the steps of extracting a network of landmark-based feature vectors Z and a network of segment-based feature vectors XY.

24. The method of claim 20, wherein said at least one model includes an extra-acoustic model representative of extra-linguistic units in said encoded speech data.

25. A method for decoding speech from encoded speech data, comprising the steps of:

segmenting said encoded speech data into plural segments of a segment space and into plural segmentations each having at least one constitutive segments;

providing at least one model to be used during word matching including at least one extra-linguistic model and including an acoustic model representative of pre-determined linguistic units; and performing word matching for competing word hypotheses using both said extra-linguistic and said acoustic models.

* * * * *